United States Patent [19]
Seidl et al.

[11] Patent Number: 5,199,834
[45] Date of Patent: Apr. 6, 1993

[54] AIR BAG STUD

[75] Inventors: Richard Seidl; Michael D. Marvell, both of Rockford, Ill.

[73] Assignee: Textron Inc., Providence, R.I.

[21] Appl. No.: 820,514

[22] Filed: Jan. 14, 1992

[51] Int. Cl.$^5$ ............... F16B 19/00; F16B 31/00; F16B 35/00; B21D 39/00
[52] U.S. Cl. .................... 411/5; 411/392; 411/412; 411/510; 411/907; 411/913; 29/456; 29/522.1; 296/35.3
[58] Field of Search ...................... 411/3–5, 411/386, 412, 413, 508–510, 907, 908, 913, 392; 296/35.1–35.3, 72; 29/456, 522.1

[56] References Cited

U.S. PATENT DOCUMENTS

| | | |
|---|---|---|
| 2,426,326 | 8/1947 | Tooms ..................... 411/907 X |
| 3,865,006 | 2/1975 | Massoney . |
| 3,905,570 | 9/1975 | Nieuwveld .................. 411/913 X |
| 4,591,203 | 5/1986 | Furman ..................... 411/510 X |
| 4,976,715 | 12/1990 | Bays et al. ................. 411/510 X |
| 5,061,137 | 10/1991 | Gourd ....................... 411/907 X |

FOREIGN PATENT DOCUMENTS 292742 11/1988 European Pat. Off. ............ 411/386

*Primary Examiner*—Neill R. Wilson
*Attorney, Agent, or Firm*—Trexler, Bushnell, Giangiorgi & Blackstone, Ltd.

[57] ABSTRACT

A fastener which releasably retains a first member in relation to a second member. The fastener is frangible for fracture upon the application of a tensioning force thereto permitting the first and second members to which the fastener is engaged to be displaced relative to one another. The fastener, once fractured, is retained in the corresponding first and second members to which it was originally attached to prevent the generation of loose pieces. An installation tool is also provided for installing the fastener into the first and second members. The fastener includes a shank which fractures into a first and a second segment. A frangible portion of the fastener is spaced along the shank between the first and second segments and defines such segments for providing a predetermined fracture point. Non-planar engaging portions on the first and second segments retain the fastener in the corresponding first and second members once engaged therewith even after fracture of the fastener. The non-planar engaging portions also prevent the fastener from rattling while it is engaged with the members. The engagement portions include a thread which has a thicker base component and a generally flexible crest component.

23 Claims, 2 Drawing Sheets

AIR BAG STUD

BACKGROUND OF THE INVENTION

The present invention pertains to fasteners and more particularly to frangible fasteners for use in an air bag type safety device deployment system.

Vehicular safety is extremely important and therefore provides motivation for continued development in safety devices to improve vehicular safety. Many types of occupant safety devices have been developed in order to protect occupants of vehicles from injuries as a result of primary and secondary collisions. For example, bodily restraints such as seat belts have been employed in cars for many years in order to prevent the occupants from being injured from a secondary collision. The secondary collision results from the occupant being thrown into a surface inside of the car, such as a steering wheel, dashboard, or windshield. Secondary collision injuries can be extremely debilitating, disfiguring, or even fatal since many of these injuries involve damage to the head or face.

Air bag safety device technology has developed in order to protect vehicle occupants from the effects of secondary collisions. An air bag type safety device involves a large inflatable bag, some form of inflating device, and a storage compartment. "Driver side" air bags have been developed that are contained within the hub of the steering wheel. This type of air bag is extremely effective such that when the air bag is deployed and inflated, it is positioned immediately in front of the driver and between the driver and the steering wheel. The deployed air bag cushions the driver's inevitable secondary impact with the steering wheel.

Several types of air bag deployment systems are available. One type of system uses a controllable combustible fuel cell which is ignited in response to an impact detected by a sensor. Once the fuel cell is ignited, non-combustible gases created by the combustion process flow through a filtering device to clean and cool the gases and inflate the air bag. The air bag is deployed and inflated in approximately 1/20th of a second and then deflated after the collision. Typically, the air bag is inflated with some form of nitrogen or other non-combustible gas.

In the driver side air bag arrangement, a cover panel covers a compartment located in the hub of the steering wheel wherein the air bag is stored. During the deployment of the air bag, the cover panel is forced off of the storage compartment, yet remains attached to the hub, as a result of forces created by the inflating air bag. The reason for retaining the panel on the hub is to prevent a loose component from becoming a potentially harmful projectile in the passenger compartment during a collision.

A similar arrangement is provided for a passenger side air bag. On the passenger side, a compartment or an opening is provided through the dashboard in front of the passenger position. The opening is covered with a releasable cover panel which is attached to the dashboard by means of some form of tether and hold down fasteners. The primary concern with regard to the passenger side air bag is to prevent the passenger from impacting the dashboard as well as the windshield.

It would be desirable to provide a fastener which will retain the cover panel over the air bag compartment until deployment of the air bag. Upon deployment of an air bag from the compartment, it would be desirable to provide a fastener which is frangible or fracturable to permit the air bag to be deployed. It would also be desirable to provide a fastener which prevents tampering with the air bag device such that the fastener cannot be loosened or removed with commonly available tools. As an additional matter, it is extremely important to provide a fastener which fractures but does not create loose projectiles during the deployment operation. As mentioned above, projectiles, and especially small projectiles, could potentially injure the passengers of the vehicle.

One form of prior art fastener device has been employed for retaining a cover panel over an air bag compartment. These types of fasteners are formed with a shank which have annular rings formed generally in a perpendicular plane and radially extend from the outside surface of the shank. The annular rings are typically designed to push back or flex upon inserting the fastener into the appropriate holes in the air bag compartment and cover panel. Such fasteners have been referred to as "Christmas tree" fasteners because when the fastener is cross-sectioned longitudinally through the central axis of the fastener, a Christmas tree type silhouette is produced.

While this type of fastener has been used to retain a cover, a problem arises such that the fastener may not be sufficiently strong to resist separation tension forces which could result in a portion of the fastener becoming a free projectile in the passenger compartment. Another problem with this type of fastener is that the fastener tends to ratchet through a hole in the member to which it is attached. This ratcheting effect resulting in a loose fit in the hole which, when combined with ordinary vehicular vibrations, produces a rattling sound. Additionally, a problem arises with these types of fasteners because the fasteners tend to fracture irregularly.

OBJECTS AND SUMMARY OF THE INVENTION

It is a general object of the present invention to provide a fastener for use under conditions where the fastener must be divided into at least two pieces upon the application of tensioning forces to the fastener, yet requires the fastener, once divided, to be retained in the members to which it was originally attached.

Another object of the present invention is to provide a fastener which prevents the generation of loose pieces once the fastener is divided.

Another object of the present invention is to provide a fastener which will fracture at a predetermined specific tensile load.

Yet a further object of the present invention is to provide a fastener which will divide at a predetermined tensile load, retain the pieces in the members to which it was originally attached, and which prevents tampering with the fastener.

Still another object of the present invention is to provide a fastener which is installed by pushing it into a member into which it is installed and once installed prevents loosening of the fastener within the member to eliminate rattling noises if the member to which it is attached is moved or vibrated.

Briefly, and in accordance with the foregoing, the present invention comprises a fastener which releasably retains a first member in relation to a second member. The fastener is frangible for dividing upon the application of a tensioning force thereto permitting the first and second members to which the fastener is engaged to be displaced relative to one another. The fastener, once divided, is retained in the corresponding first and second members to which it was originally attached to prevent the generation of loose pieces. An installation tool is also provided for installing the fastener into the first and second members.

The fastener includes a shank which fractures into first and a second segment. A frangible portion of the fastener is spaced along the shank between the first and second segments and defines such segments for providing a predetermined dividing point. Non-planar engaging portions on the first and second segments retain the fastener in the corresponding first and second members once engaged therewith even after division of the fastener. The non-planar engaging portions also prevent the fastener from rattling while it is engaged with the members. The engagement portions include a thread which has a thicker base component and a generally flexible crest component. A cavity is formed through the shank generally coaxial with a central axis of the shank. The cavity receives a post portion of the installation tool. The installation tool also includes a shank receiving recess which receives and abuts the shank for applying a force thereto during the installation operation.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE ILLUSTRATED EMBODIMENT

Figure 1:
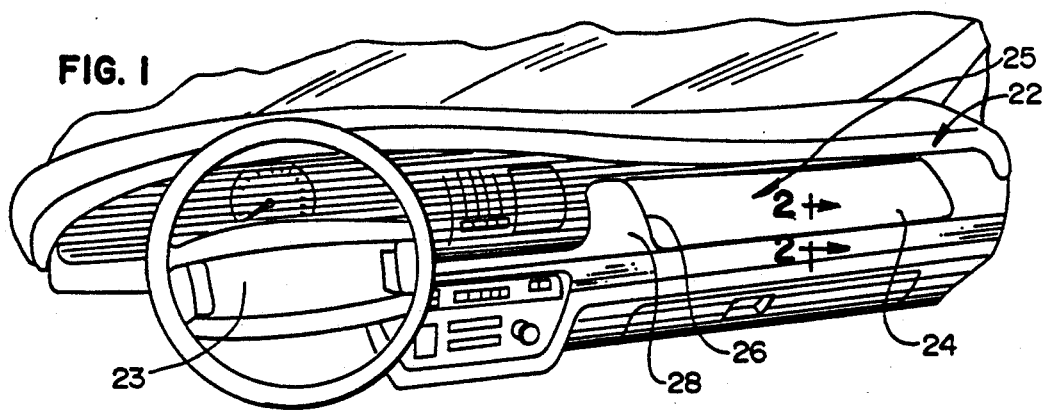
FIG. 1 is a perspective view of an automobile dashboard application in which the present is employed.

While the invention may be susceptible to embodiment in different forms, there is shown in the drawings, and herein will be described in detail, a specific embodiment with the understanding that the present disclosure is to be considered an exemplification of the principles of the invention and is not intended to limit the invention to that as illustrated and described herein.

Figure 2:
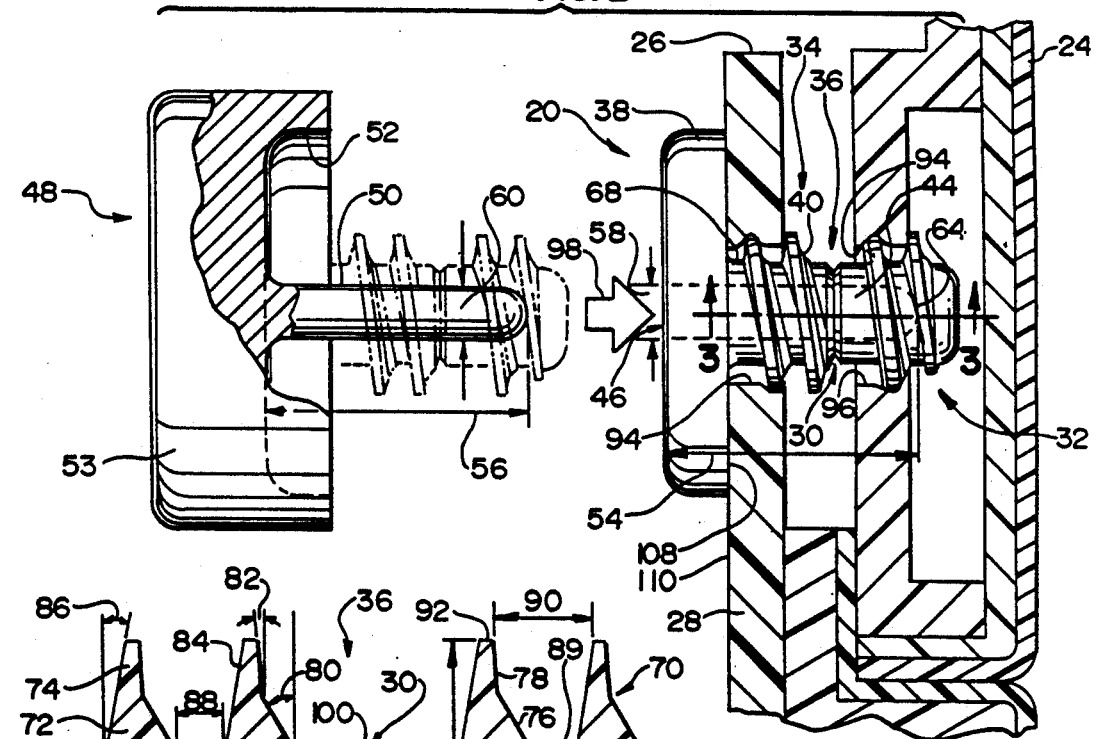
FIG. 2 is a partial fragmentary cross sectional side view of the present invention taken along line 2—2 in FIG. 1 showing two relatively movable panels having a fastener installed therein and an installation tool with a phantom outline of the fastener positioned thereon to illustrate the relationship between the fastener and the installation tool.

Referring now to the drawings, wherein like parts are designated by the same reference numerals throughout the figures, FIG. 1 shows a typical dashboard 22. In this regard, a first supplemental restraint device in the form of a steering wheel mounted, driver side air bag is employed at 23. A second, passenger side air bag is employed at 25 and is housed behind the panel 24. The dashboard 22, as shown in FIG. 1, includes at location 25 a first cover panel 24 covering an opening 26 projecting through a base portion or second member 28. The passenger side air bag, not shown, is housed behind the panel 24. The panel 24, as explained more fully hereinafter, is held in place by the frangible fastener 20 of the present invention. In FIG. 2 the fastener 20 is shown engaging both the cover panel 24 and the base portion 28 to retain the cover portion 24 in a covering relationship with respect to the opening 26 through the base portion 28.

An air bag safety device (not illustrated) is retained behind the dashboard 22 and is deployed through the opening 26 by forcing the cover panel 24 upwardly and away from the base portion 28. When the cover panel 24 is forced away from the base portion 28, the fastener 20 fractures along frangible means 30 resulting in a first segment 32 and a second segment 34 captively retained in the cover panel 24 and the base portion 28, respectively.

With reference to FIGS. 2-5, the fastener 20 includes a shank portion 36 having a head portion 38. The shank 36 could of course be formed with a smaller sized head portion 38 where necessary. Non-planar engaging means 40 in the form of a screw thread are formed on an outer surface 42 of the shank 36 for initial assembly of the fastener to the cover 24 and the base 28 in order to maintain the cover in position and for captively retaining the first and second segments 32,34 in the cover panel 24 and base portion 28, respectively, after the fastener 20 fractures. The frangible means 30 includes and is provided by an annular groove 43 or stress riser formed in the outer surface 42 of the shank 36. The thread form or helix 40 is interrupted in the area of the groove 43, such that the thread turns to the right of said groove in FIGS. 2 and 3 as viewed are not continuous with the thread turns to the left hand portion of the figures. As will be described in greater detail hereinbelow, an axially cored cavity 46 longitudinally extends generally coaxial with the central axis 44 through the shank 36.

As further shown in FIG. 2, an insertion tool 48 is used to insert or engage the fastener 20 with the cover panel 24 and the base portion 28. The insertion tool 48 is comprised of an insertion pin or post 50 extending upwardly away from a head receiving recess 52 formed in a body portion 53 of the tool 48. The head receiving recess 52 is sized and dimensioned to mate with the head portion 38 of the shank 36 of the fastener 20. Engagement of the head 38 with the head receiving recess 52 is relative to the engagement of the post 50 with the cavity 46.

A depth dimension 54 of the cavity 46 is longer than a length dimension 56 of the post 50. A diameter 58 of the cavity 46 is greater than a width dimension 60 of the post 50. The reason for the dimensions 54,58 of the cavity 46 being larger than the dimensions 56,60 of the post 50 is many-fold. First, the variation in dimensions provides for ease of insertion and removal of the post 50 with respect to the cavity 46. Second, the post dimensions 56,60 are sufficiently smaller than the cavity dimensions 54,58 to permit the cavity 46 to flex inwardly towards the post 50 when the insertion tool 48 is used to install the fastener 20 into retaining pieces. Further, the dimensions 56,60 of the post 50 are large enough to prevent the walls of the shank 36 between the outer surface 42 and the cavity 46 from collapsing.

Additionally, the length dimension 56 is sufficiently shorter than the depth dimension 54 to prevent applying a focused force on the tip end 64 of the cavity 46. Instead, an insertion force (as indicated by arrow 66) is transferred to the head portion 38 and a rim area 68 of the shank 36 where the head 38 connects to the shank 36. The column strength of the shank 36 material combined with the support of the post 50 prevent the shank 50 from buckling during the insertion process.

Figure 4:
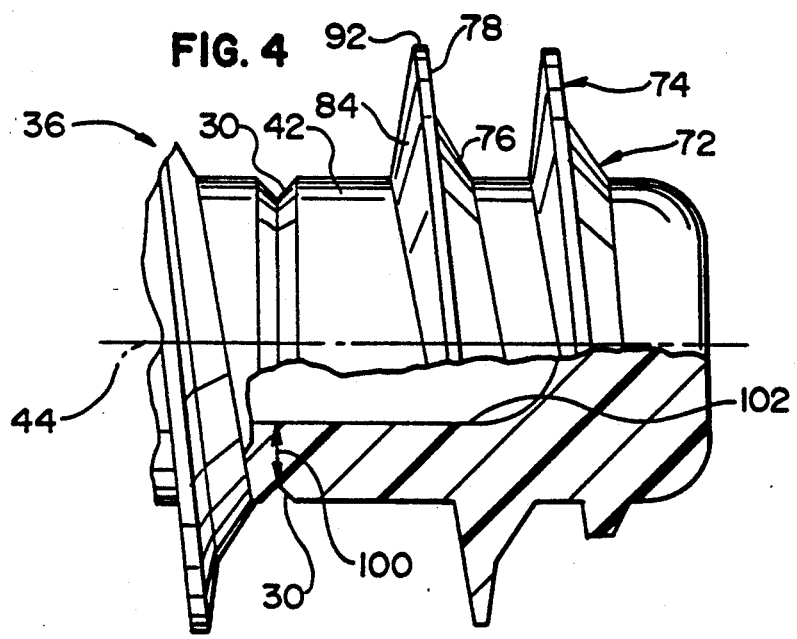
FIG. 4 is an enlarged partial cross sectional side view of a work entering tip portion of the fastener showing the detail of a thread portion, a longitudinally extending cavity, and an annular groove of the fastener.
Figure 5:
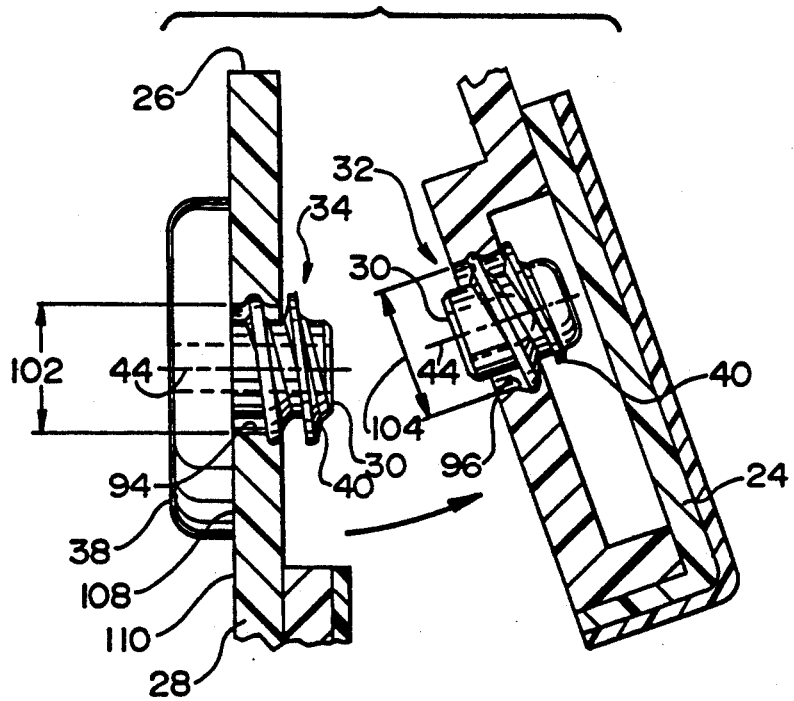
FIG. 5 is a partial fragmentary cross sectional side view of the two relatively movable panels as shown in FIG. 2 in which the fastener has been divided by a tensioning force applied thereto.

With reference to the enlarged cross-section shown in FIG. 4, the non-planar engaging means 40 is in the form of a helically disposed double angled thread 70. The double angled thread 70 includes a buttress or base component 72 extending away from the outer surface 42 of the shank 36 and a crest component 74 extending away from the base component 72. The double angled thread 70 is helically disposed having an axis generally coaxial with the central axis 44. The base component 72 is substantially thicker than the crest component 74, whereas the crest component 74 is somewhat flexible and, as shown in FIG. 5, may be flexed backwardly along the shank 36 when the fastener 20 is engaged within a bore.

The base component 72 being substantially thicker and therefore more rigid than the crest component 74, resists flexion upon insertion. A base face 76 on the insertion side of the base component is angled, as indicated at 80, at a greater angle than a corresponding angle 82 of the crest face 78. The angle 80 of the base face 76 is generally 30° and the angle 82 of the crest face 78 is generally 15°. A trailing edge 84 is sloped at an angle 86 which is generally directed away from the crest face 78 and the base face 76. The helically disposed threads 70 are spaced apart a dimension 88 measured from the base of the base face 76 to the base of the trailing edge 84 which is generally equal to the width of the thread base 89. As shown in the illustrated embodiment, the dimension 88 is approximately 0.043 inches. A crest to crest dimension 90 of the threads 70 will be determined by the overall geometry of the fastener 20. As shown in the illustrated embodiment the dimension 90 is approximately 0.075 inches. A crest tip 92 is formed between the uppermost end of the trailing edge 84 and the uppermost edge of the crest face 78.

Figure 3:
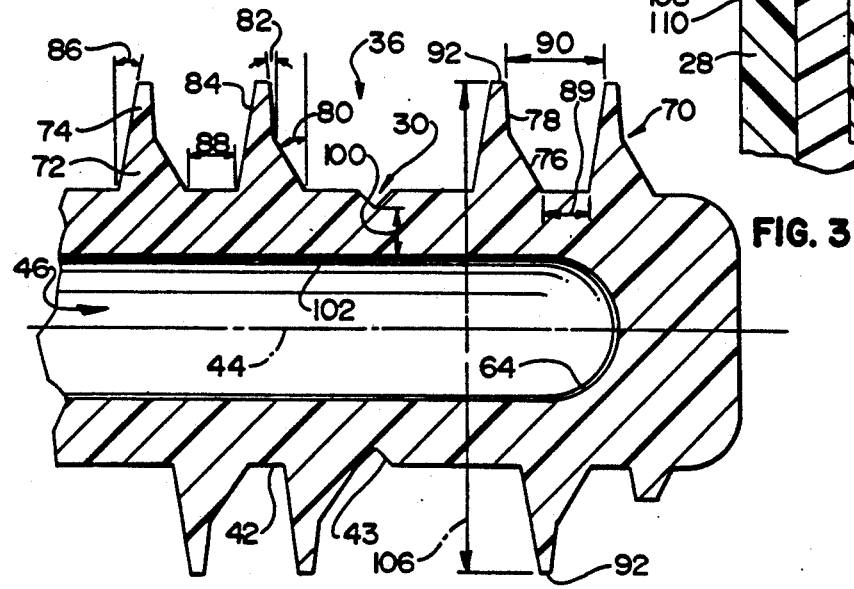
FIG. 3 is a cross sectional side view of the fastener taken along line 3—3 in FIG. 2.

The fastener 20 is inserted through the base portion 28 through a base or second bore 94 and into a first or cover bore 96. When installed, the first segment 32 of the fastener 20 is engaged in the first bore 96 and the second segment 34 is engaged in the second bore 94. As shown in FIGS. 2 and 3, the helically disposed threads 70 continuously engage the bores 94,96. Since the threads 70 are helically disposed and not planar the asymmetric structure of the threads 70 maintains a constant contact force between the threads 70 and the respective bore 94,96. The constant contact force between the threads 70 and the respective bore 94,96 prevents ratcheting of the fastener 20. With reference to the enlarged cross-sectional detail as shown in FIG. 5, the crest component 74 of the threads 70 is shown to be raked slightly backwardly toward the head portion 38 along the shank 36. Outward compression of the crest component 74 against the bore, combined with the engaging forces between the threads 70 and the material in which the bores 94,96 are formed, provide a positive constant retaining force between the fastener 20 and the members 24,28.

The frangible means 30 is generally an annular groove which is formed in the outside surface 42 of the shank 36. When a force is applied to one or both of the members 24,28 in order to displace the members 24,28 from one another, the threads 70 resist pullout but the fastener 20 will fracture when a predetermined specific force is achieved at the frangible means 30. The annular groove 30 provides a stress riser such that when an axial tensile force component, as indicated by arrow 98, is applied to the fastener 20 the fastener fractures at the annular groove 30.

As can be seen with greater detail in FIG. 4, the annular groove 30 reduces a cross-sectional dimension 100 between the annular groove 30 and an inside surface 102 of the cavity 46. Depending upon the type of material used for the fastener 20, the dimension 100 between the annular groove 30 and the inside surface 102 of the cavity 46 can be varied in order to produce separation of the first and second segments 32,34 at predetermined tensile 98 loading.

With regard to the pull-out resistance of the fastener, and more specifically the threads 70 engaged with the bores 94,96, the first and second segments 32,34 once divided are retained in the corresponding bores 96,94 of the corresponding members 24,28. In other words, the pullout resistance of the fastener 20 is sufficient to prevent pull-out of the first and second segments 32,34 under forces at least equal to those required to divide the fastener 20 at the frangible means 30. The use of retention or engaging means 40 in the form of a thread, permits the fastener 20 to be backed out or disengaged should it become necessary to remove the panel 24 for service.

Retention of the first and second segments 32,34 is extremely important when the fastener 20 is used to retain a cover over an air bag safety device. When the air bag is deployed and the cover 24 is forced away from the dashboard 22, it would be extremely detrimental to have a piece of a fastener riding on the air bag or thrown into the passenger compartment by the air bag. If a piece of the fastener 20 were to be carried by the air bag, a passenger's face could impact the piece when it impacts the air bag thereby causing injury to the passenger. However, due to the present invention, the first and second segments 32,34, once divided, are prevented from becoming projectile by being retained in the corresponding member 24,28.

During an insertion process, the bores 94,96 are formed in the respective members 28,24. The bores 94,96 are formed with diameters 102,104 which are smaller than a corresponding crest diameter 106 measured across the crest tips 92 perpendicular to the central axis 44 at diametrically opposed locations on the thread 70. A fastener 20 is engaged with the insertion tool 48 by inserting the post 50 into the cavity 46 and engaging the head 38 with the head recess 52. The insertion force 66 is applied to the tool 48 to push the fastener 20 through the bores 94,96. Because the fastener 20 is forcefully pushed into engagement with the bores 94,96, and not threaded into tapped or otherwise correspondingly formed threads inside the bores 94,96, the fastener 20 cannot be stripped during the insertion process. Further, because the crest component 74 of the thread 70 is backwardly raked and the threads 70 make continuous contact with the bores 94,96, pull-out is resisted.

The insertion process provides a positive engagement by inserting the fastener 20 until a face 108 of the head 38 engages a corresponding surface 110 of the base portion 28. The insertion process is similar to a blind rivetting process in that it is a quick insertion operation requiring placement of a fastener and rapid, generally unidirectional, application of a force thereto.

Absence of a tool engaging surface on the head 38 helps deter tampering with the fastener 20. For example, the fastener may be "unscrewed" from the bores 94,96 if a screwdriver mating head were provided in the head portion 38. Of course, a tool engaging head may be provided, however, such a feature is not shown in the illustrations provided with the present application.

It is important to note that the fastener 20 of the present invention need not only be used in an automobile but may be used in other vehicles or other situations in which an air bag safety device is employed to protect against injuries. Additionally, this fastener is also valuable in applications where a frangible fastener 20 is desired but the divided components 32,34 of the fastener 20 are to be retained.

In use, the present invention comprises a fastener 20 which is frangible and can be divided into a first and second segment 32,34 upon application of a sufficient predetermined force 98 thereto. The fastener 20 may or may not be formed with a head portion 38. An insertion tool 48 is used to drive the fastener 20 into the receiving members 24,28. The tool 48 includes a post 50 which is axially received by an axially extending cavity 46 formed in the shank 36. The head receiving recess 52 formed in the tool body 53 mates with the head 38 in order to apply forces thereto and controllably position the fastener 20.

The fastener receiving members 24,28 are prepared by forming bores 94,96 therein. The fastener 20 is positioned over a second bore 94 and driven therein by application of a suitable insertion force 66. The fastener extends through the second bore 94 and into the first bore 96. The threads 70 formed on the outside surface 42 of the shank 36 retain the first and second segments 32,34. Two components of the thread 70 include the crest component 74 and the base component 72. The crest component 74 is somewhat flexible and is therefore raked backwardly along the shank opposite the direction of insertion. The annular groove formed in the outside surface 42 of the shank 36 provides a stress riser and also divides the threads such that the thread portion is not continuous in the area where the annular groove is formed.

Figure 6:
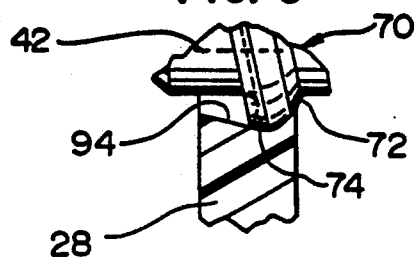
FIG. 6 is an enlarged cross sectional view of a portion of the thread engaged with an inside surface of a bore illustrating a crest component of the thread being raked backwardly towards the shank of the fastener.

As shown in FIG. 6, application of a force between the cover member 24 and the base portion 28 will divide the fastener 20 when the tensiled component of the force on the fastener achieves a sufficient predetermined level. When the material of the fastener fractures at the frangible means 30, the first and second segments 32,34 are retained in the respective bores 96,94 of the cover panel 24 and the base portion 28.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A fastener for releasably retaining a first member in relation to a second member, said fastener being frangible for fracturing upon the application of a predetermined tensioning force thereto permitting first and second members to which said fastener is engaged to be displaced, said fastener segments being retained in the first and second member after fracture; said fastener comprising a shank, a first and a second segment of said shank, frangible means spaced along said shank between said first and second segments for providing a predetermined fracture point between said first and second segments, helical engaging means on an outside surface of said first and second segments for engaging first and second members, respectively; said first and second segments being individually captively retained in a first and a second member to which said fastener is engaged, respectively, after being fractured at said frangible means upon the application of a predetermined tensioning force thereto.

2. A fastener according to claim 1 wherein said frangible means is a generally annular groove projecting into an outer surface of said shank, said annular groove providing a stress riser for promoting fracture of said fastener into said first and second segments at said annular groove upon application of a predetermined tensioning force thereto.

3. A fastener according to claim 1, wherein said helical engaging means include a helical thread having a base component and a crest component, said base component having an enlarged cross section for providing a degree of rigidity to said helical thread, said crest component having a reduced cross section relative to said base component for providing a degree of flexibility, said crest component flexing upon engaging said fastener with a first and second member.

4. A fastener according to claim 3 wherein said frangible means is a generally annular groove projecting into an outer surface of said shank, said annular groove extending through said helical threads, said annular groove providing a stress riser for promoting fracture of said fastener into said first and second segments upon application of a generally tensioning force thereto.

5. A fastener according to claim 1 wherein said fastener includes a central axis extending longitudinally through said shank, said fastener being a push-in type fastener for insertion into a first and second member by applying an inserting force to said fastener generally along said central axis.

6. A fastener according to claim 5 wherein said fastener further includes an enlarged head portion on one end of said shank and a tip portion on an end of said shank distal said head portion, said tip portion being driven through a second member and into a first member for engagement therewith, said head portion abutting a second member for resisting removal from a second member when a predetermined tensioning force is applied to said fastener to fracture said fastener at said frangible means.

7. A fastener according to claim 1 wherein a cavity is formed in said shank for promoting fracture of said fastener at said frangible means.

8. A fastener according to claim 1 wherein said fastener is integrally formed as a unitary single piece body of plastic material.

9. A fastener in combination with a first member and a second member for releasably retaining said first member in relation to said second member, said fastener being frangible for fracturing upon applying a predetermined tensioning force to at least one of said first and second members permitting displacement of said first and second members, said fastener being retained in said first and second members after fracturing; said fastener comprising a shank, a first and second segment of said shank, frangible means spaced along said shank between said first and second segments for providing a predetermined fracture point between said first and second segments, helical engaging means on an outside surface of said first and second segments for engaging said first and second members, respectively; said first and second segments being individually captively retained in said first and second members, respectively, after fracturing at said frangible means upon applying a predetermined tensioning force thereto.

10. A fastener according to claim 9 wherein said frangible means is a generally annular groove projecting into an outer surface of said shank, said annular groove providing a stress riser for promoting fracture of said fastener into said first and second segments upon application of a generally tensioning force thereto.

11. A fastener according to claim 9 wherein said fastener includes a central axis extending longitudinally through said shank, a first bore projecting into said first member and a second bore extending through said second member, said fastener being a push-in type fastener for insertion into said first and second bores in said first and second members by applying a force to said fastener generally along said central axis, said first segment being inserted through said second bore in said second member and into said first bore in said first member, said helical engaging means on an outside surface of said first segment engaging said first bore in said first member, said second member being inserted into said second bore in said second member and said helical engaging means on an outside surface of said second segment engaging said second bore in said second member.

12. A fastener according to claim 11 wherein said fastener further includes an enlarged head portion on said second segment of said shank and a tip portion on said first segment of said shank distal said head portion, said tip portion projecting into said first bore in said first member and said head portion abutting an area surrounding said second bore.

13. A fastener according to claim 9 further including a cavity longitudinally projecting into said shank for reducing the cross sectional thickness of the shank and promoting fracture of said fastener into said first and second segments at said frangible means.

14. A fastener according to claim 9 wherein said fastener is integrally formed as a unitary single piece body of a suitable plastic material.

15. A fastener in combination with an insertion tool for installing said fastener in a first and second member, said fastener releasably retaining a first member in relation to a second member when installed therein, said fastener being frangible for fracturing upon applying a generally tensioning force thereto releasing and permitting displacement of the first and second members, said fastener being retained in a first and second member after fracturing; said fastener comprising a shank, a first and a second segment of said shank, frangible means spaced along said shank between and defining said first and second segments for providing a predetermined fracture point between said first and second segments, a cavity longitudinally projecting into said shank for reducing the cross sectional thickness of the shank and promoting fracture of said fastener into said first and second segments at said frangible means, helical engaging means on an outside surface of said first and second segments for engaging first and second members, respectively, said first and second segments being individually captively retained in a first and a second member, respectively, after fracturing at said frangible means; said insertion tool comprising a shank receiving recess and a post extending from said recess, said post mating with said cavity and said recess receiving said shank for applying a force to said fastener for installing said fastener into a first and second member.

16. A fastener in combination with an insertion tool according to claim 15 wherein a diameter and length of said post is smaller than a corresponding diameter and length dimension of said cavity in said fastener for providing compression space between an inside surface of said cavity and an outside surface of said post to permit said fastener to inwardly compress when it is being installed in a first and second member.

17. A fastener in combination with an insertion tool according to claim 15 wherein said fastener includes a central axis extending longitudinally through said shank, a first bore projecting into a first member and a second bore projecting through a second member, said fastener being a push-in type fastener for insertion into a first and second bore in a first and second member by applying a force to said fastener generally along said central axis, said first segment being inserted through a second bore in a second member and into a first bore in a first member, said helical engaging means on an outside surface of said first segment engaging a first bore in a first member, said second member being inserted into a second bore of a second member and said helical engaging means on an outside surface of said second segment engaging a second bore in a second member.

18. A method of using a fastener in combination with an insertion tool said fastener releasably retaining a first member in relation to a second member when installed therein, said fastener being frangible for fracturing upon applying a generally tensioning force thereto releasing and permitting displacement of the first and second members, said fastener being retained in a first and second member after fracturing; said fastener comprising a shank, a first and a second segment of said shank, frangible means spaced along said shank between and defining said first and second segments for providing a predetermined fracture point between said first and second segments, a cavity longitudinally projecting into said shank for reducing the cross sectional thickness of the shank and promoting fracture of said fastener into said first and second segments at said frangible means, helical engaging means on an outside surface of said first and second segments for engaging first and second members, respectively, said first and second segments being individually captively retained in a first and a second member, respectively, after fracturing at said frangible means, a central axis extending longitudinally through said shank, a first bore projecting into a first member and a second bore projecting through a second member, said fastener being a push-in type fastener for insertion into a first and second bore in a first and second member by applying a force to said fastener generally along said central axis, said first segment being inserted through a second bore in a second member and into a first bore in a first member, said helical engaging means on an outside surface of said first segment engaging a first bore in a first member, said second member being inserted into a second bore of a second member and said helical engaging means on an outside surface of said second segment engaging a second bore in a second member; said insertion tool comprising a shank receiving recess and a post extending from said recess, said post mating with said cavity and said recess receiving said shank for applying a force to said fastener for installing said fastener into a first and second member;

said method comprising the following steps:

positioning said fastener in alignment relative to a second bore in a second member;

inserting said post of said insertion tool into said cavity in said fastener;

mating said recess of said insertion tool with said shank of said fastener;

applying a force to said insertion tool along said central axis for engaging said fastener with a first and second bore in a first and second member;

removing said installation tool from said fastener.

19. A method of using a fastener in combination with an insertion tool said fastener releasably retaining a first member in relation to a second member when installed therein, said fastener being frangible for fracturing upon applying a generally tensioning force thereto releasing and permitting displacement of the first and second members, said fastener being retained in a first and second member after fracturing; said fastener comprising a shank, a first and a second segment of said shank, frangible means spaced along said shank between and defining said first and second segments for providing a predetermined fracture point between said first and second segments, a cavity longitudinally projecting into said shank for reducing the cross sectional thickness of the shank and promoting fracture of said fastener into said first and second segments at said frangible means, helical engaging means on an outside surface of said first and second segments for engaging first and second members, respectively, said first and second segments being individually captively retained in a first and a second member, respectively, after fracturing at said frangible means, a central axis extending longitudinally through said shank, a first bore projecting into a first member and a second bore projecting through a second member, said fastener being a push-in type fastener for insertion into a first and second bore in a first and second member by applying a force to said fastener generally along said central axis, said first segment being inserted through a second bore in a second member and into a first bore in a first member, said helical engaging means on an outside surface of said first segment engaging a first bore in a first member, said second member being inserted into a second bore of a second member and said helical engaging means on an outside surface of said second segment engaging a second bore in a second member; said insertion tool comprising a shank receiving recess and a post extending from said recess, said post mating with said cavity and said recess receiving said shank for applying a force to said fastener for installing said fastener into a first and second member;

said method comprising the following steps:

positioning said cavity of said fastener over said post of said insertion tool;

mating said recess of said insertion tool with said shank of said fastener;

positioning said fastener on said insertion tool in insertion alignment with a second bore in a second member;

applying a force to said insertion tool generally along said central axis for engaging said fastener with a first and second bore in a first and second member;

removing said installation tool from said fastener.

20. A fastener in combination with a vehicle structure including a removable panel and an opening formed in said vehicle structure being covered by said panel, said fastener retaining said panel in a covering relation over said opening for concealing a deployable safety device, deployment of said safety device creating forces on said panel, said fastener being frangible for fracture upon application of said force to said panel for uncovering said opening, said fastener being retained in said panel and said vehicle structure after deployment of the safety device; said fastener comprising: a shank, a first and a second segment of said shank, an annular groove spaced along said shank between said first and second segments for providing a predetermined frangible fracture point between said first and second segments, helical engaging means on an outside surface said first and second segments for engaging said cover panel and said vehicle structure, respectively, said first and second segments being individually captively retained in said cover panel and vehicle structure, respectively, after fracturing at said annular groove upon the application of a generally tensioning force thereto upon deployment of said safety device.

21. A fastener according to claim 20 further including a cavity longitudinally projecting into said shank for reducing the cross sectional thickness of said shank and promoting fracture of said fastener into said first and second segments at said annular groove.

22. A fastener according to claim 21 said helical engaging means further comprising helically disposed thread on an outside surface of said shank, said thread including a base component and a crest component, said base component having an enlarged cross section for providing a degree of rigidity to said thread, said crest having a reduced cross section relative to said base component for providing a degree of flexibility, said crest portion flexing upon inserting said fastener into a first and second member, said annular groove extends through said thread.

23. A fastener according to claim 22 wherein said fastener is integrally formed as a unitary single piece body of a suitable plastic material.

* * * * *